(12) United States Patent
Bolluyt et al.

(10) Patent No.: US 11,992,793 B2
(45) Date of Patent: May 28, 2024

(54) DEVICES, SYSTEMS AND METHODS FOR A FILTER

(71) Applicant: Mott Corporation, Farmington, CT (US)

(72) Inventors: Jonathan Bolluyt, Bristol, CT (US); Wayne White, Granby, CT (US); Allen Beaune, Norfolk, CT (US); Aravind Mohanram, Avon, CT (US); John E. Rosenberger, Plantsville, CT (US)

(73) Assignee: MOTT CORPORATION, Farmington, CT (US)

( * ) Notice: Subject to any disclaimer, the term of this patent is extended or adjusted under 35 U.S.C. 154(b) by 176 days.

(21) Appl. No.: 17/418,986

(22) PCT Filed: Dec. 24, 2019

(86) PCT No.: PCT/US2019/068491
§ 371 (c)(1),
(2) Date: Jun. 28, 2021

(87) PCT Pub. No.: WO2020/139894
PCT Pub. Date: Jul. 2, 2020

(65) Prior Publication Data
US 2022/0105456 A1   Apr. 7, 2022

Related U.S. Application Data

(60) Provisional application No. 62/786,014, filed on Dec. 28, 2018.

(51) Int. Cl.
*B01D 39/20* (2006.01)
*B01D 29/11* (2006.01)
(Continued)

(52) U.S. Cl.
CPC ........ *B01D 39/2041* (2013.01); *B01D 29/111* (2013.01); *B01D 29/23* (2013.01);
(Continued)

(58) Field of Classification Search
None
See application file for complete search history.

(56) References Cited

U.S. PATENT DOCUMENTS 2,645,702 A * 7/1953 Harmon, Jr. .......... B21C 37/157
219/61.7
3,426,910 A * 2/1969 Winzen .................. B01D 29/21
210/493.1
(Continued)

FOREIGN PATENT DOCUMENTS

EP   0951931 A1   10/1999
GB   2132504 A  *  7/1984   .......... B01D 46/002

OTHER PUBLICATIONS

International Search Report for International Application No. PCT/US2019/068491, International Filing Date Dec. 24, 2019, dated Apr. 29, 2020, 6 pages.
(Continued)

*Primary Examiner* — Gabriel E Gitman
(74) *Attorney, Agent, or Firm* — CANTOR COLBURN LLP

(57) ABSTRACT

The present disclosure generally relates to the field of filtration. In particular, the present disclosure relates to filtration devices, systems and methods for high flowrates and low pressure differentials through porous bodies of metal fiber media.

14 Claims, 5 Drawing Sheets

(51) Int. Cl.
  *B01D 29/23* (2006.01)
  *B01D 46/24* (2006.01)
  *B21D 51/16* (2006.01)
  *B23K 9/02* (2006.01)
  *B23K 15/00* (2006.01)
  *B23K 26/24* (2014.01)
  *B23K 31/02* (2006.01)

(52) U.S. Cl.
  CPC ......... *B01D 46/2407* (2013.01); *B21D 51/16* (2013.01); *B23K 9/02* (2013.01); *B23K 15/0053* (2013.01); *B23K 26/24* (2013.01); *B01D 2201/0415* (2013.01); *B23K 31/027* (2013.01)

(56) References Cited

U.S. PATENT DOCUMENTS

| | | |
|---|---|---|
| 4,940,476 A | 7/1990 | Buck |
| 5,123,896 A | 6/1992 | Gilbert |
| 5,690,823 A | 11/1997 | Reipur et al. |
| 5,948,257 A | 9/1999 | Custer et al. |
| 6,398,837 B1 | 6/2002 | Alvin et al. |
| 6,511,598 B2* | 1/2003 | Gershenson .......... B01D 29/15 210/342 |
| 7,112,234 B2 | 9/2006 | Jha et al. |
| 2004/0129651 A1* | 7/2004 | Vanhoutte .......... B01D 39/2044 210/798 |
| 2004/0168418 A1* | 9/2004 | Jha ..................... C04B 41/4582 55/486 |
| 2012/0211411 A1 | 8/2012 | Hopkins |
| 2013/0082011 A1* | 4/2013 | Wittmer ............... B01D 29/908 210/797 |
| 2016/0003379 A1 | 1/2016 | Baek |
| 2016/0038862 A1* | 2/2016 | Barnwell .......... B01D 46/2414 210/232 |
| 2017/0239726 A1 | 8/2017 | Palumbo et al. |

OTHER PUBLICATIONS

Written Opinion for International Application No. PCT/US2019/068491, International Filing Date Dec. 24, 2019, dated Apr. 29, 2020, 13 pages.

Zhang Yanil; "Fundamentals of Mechanical Manufacturing Technology"; 2016; pp. 75-76, English Translation.

* cited by examiner

DEVICES, SYSTEMS AND METHODS FOR A FILTER

CROSS REFERENCE TO RELATED APPLICATIONS

This application is a National Stage application of PCT/US2019/068491, filed Dec. 24, 2019, which claims the benefit of U.S. Provisional Application No. 62/786,014, filed Dec. 28, 2018, both of which are incorporated by reference in their entirety herein.

FIELD

The present disclosure generally relates to the field of filtration. In particular, the present disclosure relates to filtration devices, systems and methods for high flowrates and low pressure differentials through porous bodies of metal fiber media.

BACKGROUND

Supply lines that provide fluid flow may require filtration before the fluid is used for processing. The initial pressure of fluid from an inlet may be substantially higher than what is supplied at an eventual outlet for processing. Traditional filters, such as bulk filters and the like, often use denser media that are powder metal based that may substantially impede fluid flow or need an additional coating layer and/or additional processing strategies such as pleating to increase surface area in order to achieve low pressure drop. These filters may also be ineffective at small diameters and lengths because they may not be able to accommodate high flowrates and/or may require multiple filters arranged in series. The pressure drop caused by these filters may be undesirable for processing and may require additional energy and costs added to the system to maintain desired high flow rates.

A variety of advantageous flow and filtration performance outcomes may be realized by the filtration devices, systems, and methods of the present disclosure, which allow for desirable flowrates at both an inlet and an outlet without an undesirable pressure differential.

SUMMARY

Embodiments of the present disclosure may assist generally with fluid filtration without a significant pressure drop or loss in flowrate. In one embodiment, a filter may include a porous elongate body. The porous elongate body may include metal fiber media and may have a first end that is open, a second end that is closed, and a porous sidewall configured to filter fluids that flow through it. A duct may extend from the first end to the second end. The porous elongate body may define a flow path from the first end, into the duct, and across the porous sidewall. A solid plate may be at the second end. A ferrule may be connected about the first end of the porous elongate body. The porous elongate body may include a rolled sheet of metal fiber media. A first seam weld may extend along an end of the rolled sheet of metal fiber media. A second seam weld may be along the porous elongate body substantially offset about 180 degrees from the first seam weld about a longitudinal axis extending along the porous elongate body. A flow of a fluid through the flow path across the porous sidewall may include a pressure differential of less than about 10 pounds per square inch.

In another aspect, a filter system may include a plurality of porous elongate bodies each comprising metal fiber media. Each body may have a first end that is open, a second end that is closed, a duct extending from the first end to the second end and may define a flow path from the first end, into the duct, and across a porous sidewall. A housing may have an inlet and an outlet, disposed about the plurality of porous elongate bodies. The plurality of porous elongate bodies may be disposed within the housing in parallel such that each first end may be oriented toward the inlet and each second end may be oriented toward the outlet. Each of the plurality of porous elongate bodies may include a solid plate at the second end. Each of the solid plates may be connected to an outlet brace of the housing. Each of the plurality of porous elongate bodies may include a ferrule connected about the first end. Each of the ferrules may be connected to an inlet brace of the housing. Each of the plurality of porous elongate bodies may include a rolled sheet of metal fiber media. Each of the plurality of porous elongate bodies may include a first seam weld along an end of the rolled sheet of metal fiber media. Each of the plurality of porous elongate bodies may include a second seam weld that is substantially offset about 180 degrees from the first seam weld about a longitudinal axis extending along the porous elongate body. A flow of a fluid through the filter system from the inlet through the outlet may include a flowrate greater than 500 standard liters per minute and a pressure differential of less than about 10 pounds per square inch.

In another aspect, a method of manufacturing a filter may include compacting a plurality of metal fibers into a first thin sheet. The first thin sheet may be cut. The first thin sheet may be rolled into a first porous elongate body such that there is a portion of the sheet overlapping itself. The portion may be about an eighth of an inch. The portion of the porous elongate body may be seam welded. The seam welding may be along a length of the porous elongate body that is substantially 180 degrees offset about a longitudinal axis of the porous elongate body. A connector may be seam welded about a first end of the porous elongate body. A solid plate may be seam welded at a second end of the porous elongate body. A second thin sheet may be disposed about the porous elongate body.

BRIEF DESCRIPTION OF THE DRAWINGS

Non-limiting embodiments of the present disclosure are described by way of example with reference to the accompanying figures, which are schematic and not intended to be drawn to scale. In the figures, each identical or nearly identical component illustrated is typically represented by a single numeral. For purposes of clarity, not every component is labeled in every figure, nor is every component of each embodiment shown where illustration is not necessary to allow those of ordinary skill in the art to understand the disclosure. In the figures.

DETAILED DESCRIPTION

Figure 1:
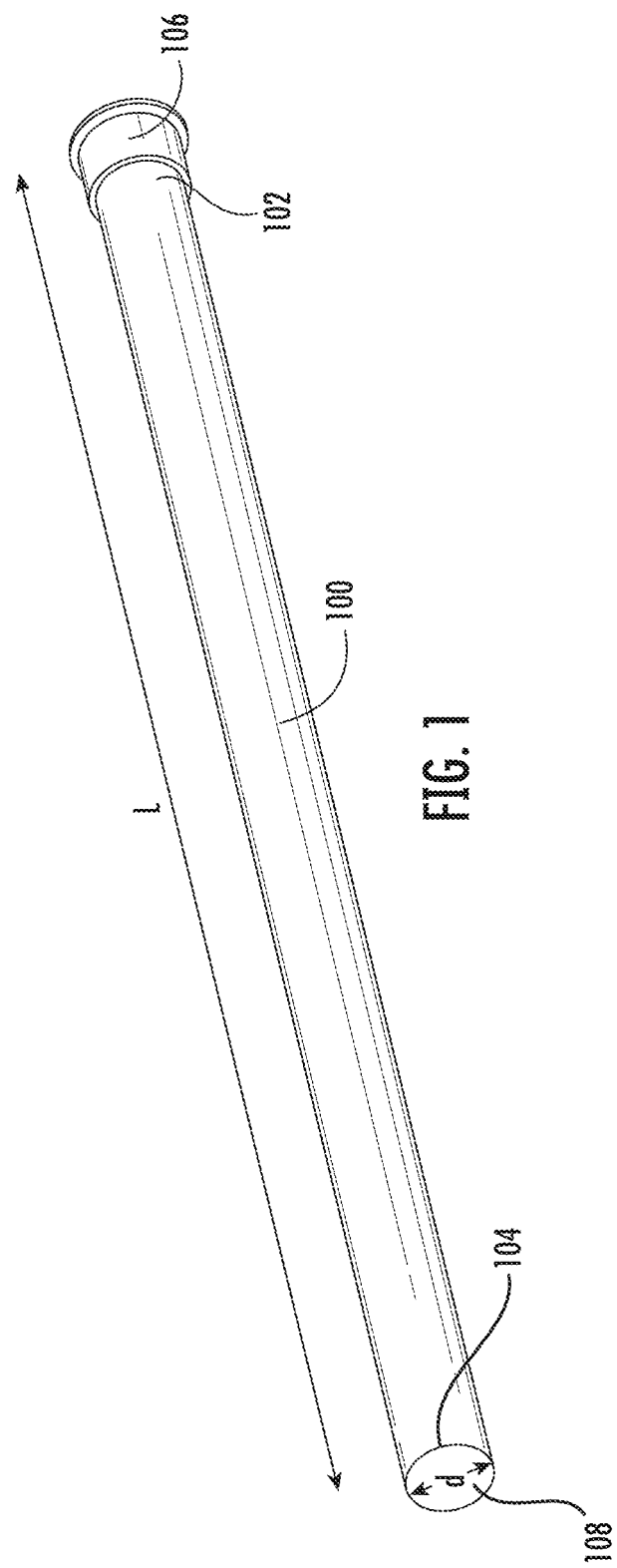
FIG. 1 illustrates a filter, according to an embodiment of the present disclosure.

The present disclosure is not limited to the particular embodiments described. The terminology used herein is for the purpose of describing particular embodiments only and is not intended to be limiting beyond the scope of the appended claims. Unless otherwise defined, all technical terms used herein have the same meaning as commonly understood by one of ordinary skill in the art to which the disclosure belongs.

As used herein, the singular forms "a," "an," and "the" are intended to include the plural forms as well, unless the context clearly indicates otherwise. The terms "comprises" and/or "comprising," or "includes" and/or "including" when used herein, specify the presence of stated features, regions, steps, elements and/or components, but do not preclude the presence or addition of one or more other features, regions, integers, steps, operations, elements, components and/or groups thereof.

As used herein, the conjunction "and" includes each of the structures, components, features, or the like, which are so conjoined, unless the context clearly indicates otherwise, and the conjunction "or" includes one or the others of the structures, components, features, or the like, which are so conjoined, singly and in any combination and number, unless the context clearly indicates otherwise.

All numeric values are herein assumed to be modified by the term "about," whether or not explicitly indicated. The term "about", in the context of numeric values, generally refers to a range of numbers that one of skill in the art would consider equivalent to the recited value (i.e., having the same function or result). In many instances, the term "about" may include numbers that are rounded to the nearest significant figure. Other uses of the term "about" (i.e., in a context other than numeric values) may be assumed to have their ordinary and customary definition(s), as understood from and consistent with the context of the specification, unless otherwise specified. The recitation of numerical ranges by endpoints includes all numbers within that range, including the endpoints (e.g. 1 to 5 includes 1, 1.5, 2, 2.75, 3, 3.80, 4, and 5).

It is noted that references in the specification to "an embodiment", "some embodiments", "other embodiments", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art to affect such feature, structure, or characteristic in connection with other embodiments, whether or not explicitly described, unless clearly stated to the contrary. That is, the various individual elements described below, even if not explicitly shown in a particular combination, are nevertheless contemplated as being combinable or arrangeable with each other to form other additional embodiments or to complement and/or enrich the described embodiment(s), as would be understood by one of ordinary skill in the art.

A fluid used in a process may need to be filtered before it is in a usable product form. Such a fluid may have a relatively high source flowrate, for example 200,000 standard liters per minute (SLPM), which may cause an undesirable pressure drop during filtration. Filtration from a supply point of entry to a point of use may include one or more filters arranged in series that may impede the flowrate due to a significant pressure drop across the filtration system. Processing flowrates (e.g., 500 SLPM or higher) and required pressure may be unachievable because of pressure drops associated with conventional filtration systems. Filters that meet particle retention requirements, but use traditional materials (e.g., powder metal porous medias and/or loose fiber tubes) that attempt to maintain a desirable flowrate and low pressure drop may require a large filtration area. Traditional materials are limited in size (for example, no larger than about 0.5 inches (12.7 mm) in diameter by about 15 inches (381 mm) in length, or no larger than about 1 inch (25.4 mm) in diameter by about 3 inches (76.2 mm) in length, or the like) due to limitations in the manufacturing processes and limitations in the performance of the media itself. These filters may require more media in a fluid flow line, larger filtration areas, more equipment, and/or larger footprints than the embodiments described herein the present disclosure.

Various embodiments of the present disclosure make use of metal fiber filtration media. In some embodiments, the media used is an efficient filtration sheet is made of metal fiber. The metal fiber media may comprise numerous small (e.g., 1.5 uni diameter) metal fibers that are compressed and sintered into a thin sheet. A sheet may be made up of, for example, about 4% metal and about 96% vacant space. Such a thin metal sheet may accommodate fluid flow rates of over about 50,000 SLPM and pressure drops across the sheet of less than about 3.0 psi or flow rates of over about 500 SLPM and pressure drops across the sheet of less than about 10 psi. These and other thin metal sheets may be manipulated and/or used in the embodiments described herein. Various embodiments include porous bodies that comprise one or more metal fiber layers rolled axially to define a porous body. Filters made up of such porous bodies may achieve three or more times the flow rate of traditional filters because the particle retention characteristics and low density of the metal fiber sheet provide higher flow per unit area and flow areas (e.g., $A_{flow}$=ndL of FIG. 1 as described below) may be increased easily by increasing L and d.

With reference to FIG. 1, a system embodiment for a filter according to the present disclosure is illustrated that includes a porous filter elongate body 100 made up of metal fiber media. The elongate body 100 has a first end 102 that is open, a second end 104 that is closed, and a duct extending from the first end 102 to the second end 104. The elongate body 100 has a porous sidewall configured to filter fluids that flow through it. In FIG. 1, this sidewall is substantially cylindrical and extends along the length of the body 100. The first end 102 is open to receiving a fluid into the duct. A ferrule 106 is connected about the first end 102 of the elongate body 100 that may assist with connecting the filter with a supply line of a fluid such that the first end 102 is fluidly coupled to the supply line. The porous elongate body 100 defines a flow path for a fluid from the first end 102, into the duct, and across the porous sidewall of the elongate body 100. The second end 104 of the elongate body 100 includes a solid plate 108 that substantially prevents a fluid from egressing from the duct out of the second end 104. Because the second end 104 is occluded with the solid plate 108, a flow of fluid through the duct is forced across the sidewall of the porous elongate body 100. Alternatively, the solid plate 108 may comprise a porous plate that may also allow a flow of fluid across it. Embodiments of a filter may include a porous elongate body that has a length L that may be about 1 inch (25.4 mm) to about 36 inches (914.4 mm) and a diameter d that may be about 0.5 inches (12.7 mm) to about 4 inches (101.6 mm).

Figure 2:
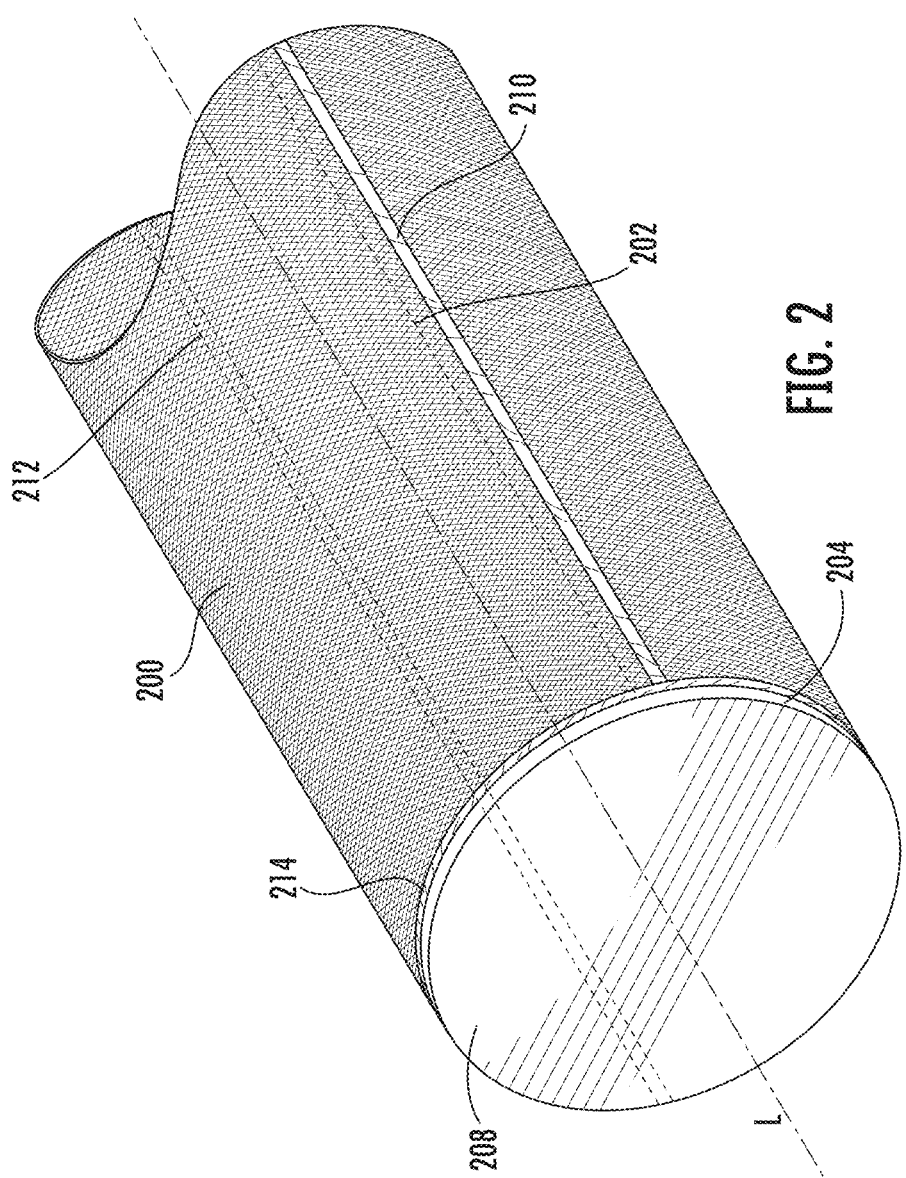
FIG. 2 illustrates an end portion of a filter, according to an embodiment of the present disclosure.

With reference to FIG. 2, an end portion of a device embodiment for a filter according to the present disclosure is illustrated that includes a porous filter elongate body 200 that is a rolled metal fiber sheet. In one embodiment, the elongate body 200 includes a sheet that is rolled into a porous sidewall of the body 200. The sheet is rolled such that there is an overlap region 202 along an end of the sheet that makes up the elongate body 200. The amount of overlapping of the sheet of the elongate body 200 in the overlap region 202 may vary depending on manufacturing tolerances and precisions, and may be, for example, about 0.125 inches (3.175 mm). A first seam weld 210 runs along the length of the overlap region 202 such that a substantial amount of fluid cannot egress from a duct within the porous elongate body 200 without flowing across the porous sidewall of the elongate body 200. A second seam weld 212 extends along the length of the porous elongate body 200 that is about 180 degrees offset from the first seam weld 210 about a longitudinal axis 1 extending through the elongate body 200. The second seam weld 212 substantially straightens the elongate body 200 along the longitudinal axis from any bending that occurred when disposing the first seam weld 210 along the elongate body 200. A solid plate 208 is disposed on an end of the elongate body 200. The solid plate 208 is attached to an end 204 of the elongate body 200 by a third seam weld 214. The solid plate 208 substantially prevents a fluid flow path from within the duct out of the end 204 of the elongate body 200.

Figure 3A:
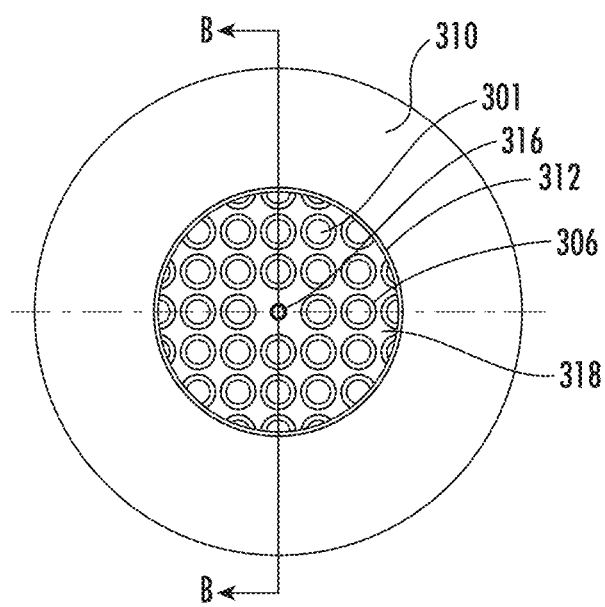
FIG. 3A illustrates an axial view of a filter system including a plurality of porous elongate bodies, according to an embodiment of the present disclosure.
Figure 3B:
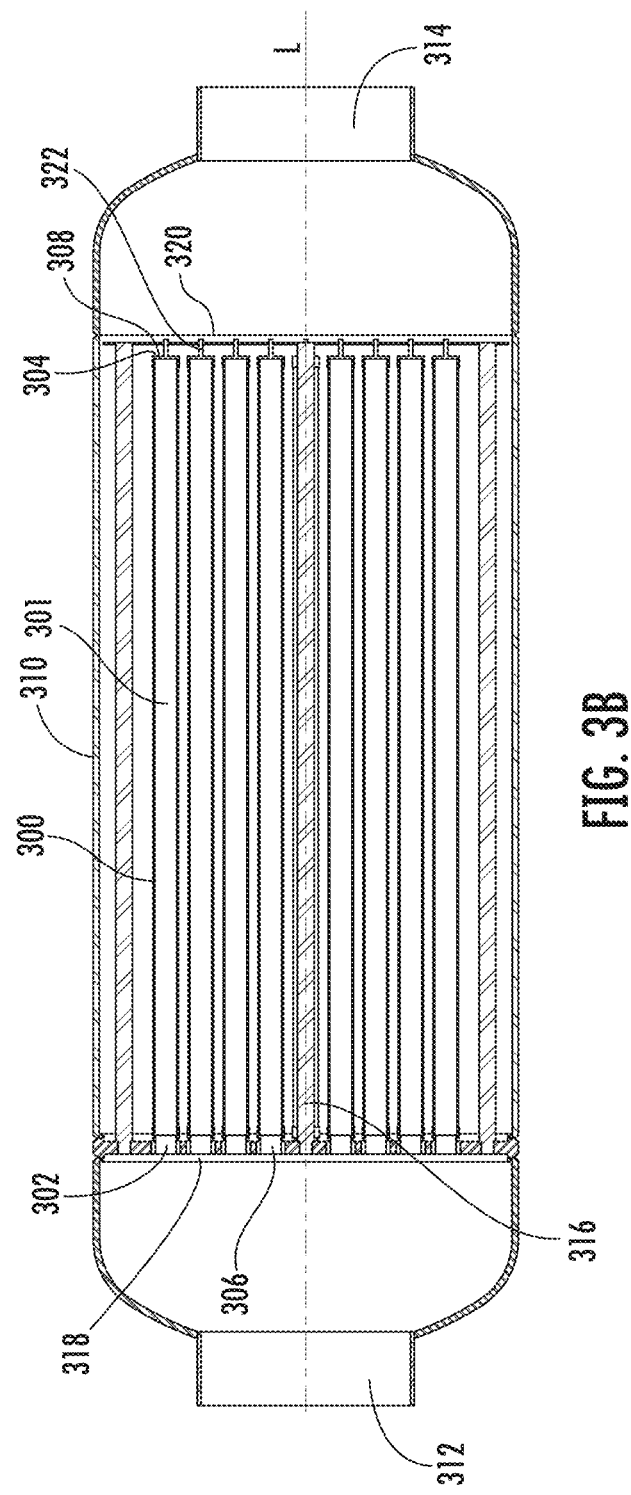
FIG. 3B illustrates a longitudinal cross-sectional view of the system of FIG. 3A.

With reference to FIGS. 3A and 3B, a system embodiment for a filter according to the present disclosure is illustrated that includes a housing 310 containing numerous porous filter elongate bodies 300. The porous elongate bodies 300 are each made up of metal fiber media and each have a first end 302 that is open, a second end 304 that is closed and a duct 301 extending from the first end 302 to the second end 304. The first end 302 of each elongate body 300 includes a ferrule 306 connected to an inlet brace 318 of the housing 310. The second end 304 of each elongate body 300 includes a solid plate 308 having a locating pin 322 that is a ⅛-inch rod that aligns with an outlet brace 320 of the housing 310. The inlet brace 318 includes numerous apertures for the ferrules 306 and may have an overall diameter of, e.g., about 12 inches, or the like. The braces 318, 320 are a pressure boundary that forces a flow of fluid into the open ends of each elongate body 300. The housing 310 optionally includes support braces 316 extending between and supporting the inlet brace 318 and the outlet brace 320. The porous elongate bodies 300 are preferably installed within the housing 310 in parallel such that each first end 302 is substantially oriented toward an inlet 312 of the housing 310. Each elongate body 300 extends substantially parallel with a longitudinal axis 1 of the housing 310. Each first end 302 of the elongate bodies 300 is substantially in a plane that is substantially transverse with the longitudinal axis 1. Each second end 304 of the elongate bodies 300 is oriented toward an outlet 314 of the housing 310. Each second end 304 of the elongate bodies 300 is substantially in a plane that is substantially transverse with the longitudinal axis 1. A fluid flow path through this system extends through the inlet 312, into the numerous first ends 302, into the ducts 301, across a sidewall of the porous elongate bodies 300, and through the outlet 314. The numerous porous elongate bodies 300 allow for a larger volume of fluid into the inlet 312 of the housing 310 than one porous body 300 could filter alone. Additionally, the parallel bodies 300 in the housing 310 are able to substantially maintain fluid flowrate and pressure when compared to traditional filters. Such an arrangement may also reduce the footprint of the system required for installation.

Figure 4:
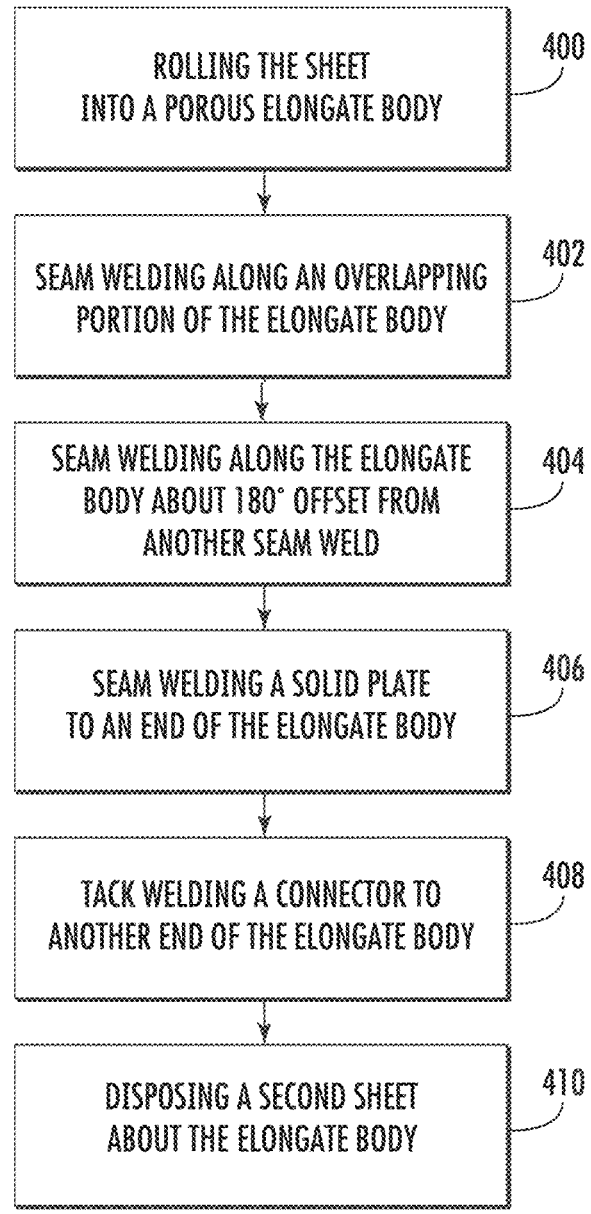
FIG. 4 illustrates a method of manufacturing a filter, according to an embodiment of the present disclosure.

With reference to FIG. 4, a method of manufacturing a filter according to an embodiment of the present disclosure is illustrated that may include compacting and sintering metal fibers into a thin sheet. The thin sheet may be cut into a desirable size for creating a porous elongate body. The sheet may be rolled 400 into a porous elongate body that may be a substantially curved and/or cylindrical shape. The rolled sheet may have a portion of the sheet overlapping itself. The overlapping portion may be seam welded 402. Because the ratio of the sheet thickness to the weld thickness is so small, the seam weld may influence the overall shape of the sheet. For example, a seam weld on the overlapping portion along the length of the elongate body may deform, bend, and/or bow the overall shape of the elongate body from a substantially straight orientation to a bent and/or bowed orientation. An additional seam weld may be welded 404 along the elongate body that is substantially 180 degrees offset about a longitudinal axis of the porous elongate body in a substantially straight orientation. The additional seam may re-orient the elongate body from a deformed shape to a substantially straight shape. A solid plate may be seam welded 406 to an end of the elongate body. A connector may be tack welded 408 to another end of the elongate body. A second thin sheet may be disposed 410 about the elongate body.

In various embodiments, porous elongate bodies may be made up of thin metal fiber sheets. These sheets may be delicate because of their relatively small wall thickness and small mass in relation to their length and/or diameter. Applying a seam weld along a length of a delicate sheet to create a porous elongate body may deform the elongate body because of the addition of heat and mass to a portion of the elongate body. One or more additional seam welds may be applied to other portions of the elongate body to substantially counter-act any undesirable deformation. In various embodiments, although specific reference is made to particular kinds of welds (e.g., seam welding, tack welding, etc.), such welding may additionally or alternatively include brazing, laser welding, arc welding, e-beam welding, or other similar metal joining technique.

Exemplary devices, systems, and methods with which embodiments of the present disclosure may be implemented include, but are not limited to, those described in U.S. Pat. No. 7,112,234, and U.S. patent application Ser. No. 15/395,528, each of which are herein incorporated by reference in their entirety. Exemplary devices described therein may be modified to incorporate embodiments or features of the present disclosure.

All of the devices and/or methods disclosed and claimed herein can be made and executed without undue experimentation in light of the present disclosure. While the devices and methods of this disclosure have been described in terms of preferred embodiments, it may be apparent to those of skill in the art that variations can be applied to the devices and/or methods and in the steps or in the sequence of steps of the method described herein without departing from the concept, spirit and scope of the disclosure. All such similar substitutes and modifications apparent to those skilled in the art are deemed to be within the spirit, scope and concept of the disclosure as defined by the appended claims.

What is claimed is:
1. A filter comprising:
a porous elongate body comprising metal fiber media, having a first end that is open, a second end that is closed, and a porous sidewall configured to filter fluids that flow through it;
a duct extending from the first end to the second end;

wherein the porous elongate body defines a flow path from the first end, into the duct, and across the porous sidewall; and wherein the porous elongate body comprises a rolled sheet of metal fiber media overlapping itself, a first seam weld extending lengthwise along the rolled sheet of metal fiber media at the overlap, and a second weld extending lengthwise along the porous elongate body, wherein the second weld is substantially offset about 180 degrees from the first seam weld about a longitudinal axis extending along the porous elongate body.

2. The filter of claim 1, further comprising a solid plate at the second end.

3. The filter of claim 2, further comprising a ferrule connected about the first end of the porous elongate body.

4. The filter of claim 1, wherein a flow of a fluid through the flow path across the porous sidewall comprises a pressure differential of less than about 10 pounds per square inch.

5. A filter system comprising:
a plurality of porous elongate bodies each comprising metal fiber media, each having a first end that is open, a second end that is closed, a duct extending from the first end to the
second end, and wherein the each porous elongate body defines a flow path from the first end, into the duct, and across a porous sidewall, and wherein each porous elongate body comprises a rolled sheet of metal fiber media forming the porous sidewall overlapping itself, a first seam weld extending lengthwise along the rolled sheet of metal fiber media at the overlap, and a second weld extending lengthwise along the porous elongate body, wherein the second weld is substantially offset about 180 degrees from the first seam weld about a longitudinal axis extending along the porous elongate body; and
a housing having an inlet and an outlet, disposed about the plurality of porous elongate bodies; and wherein the plurality of porous elongate bodies are disposed within the housing in parallel such that each first end is oriented toward the inlet and each second end is oriented toward the outlet.

6. The filter system of claim 5, wherein each of the plurality of porous elongate bodies further comprises a solid plate at the second end.

7. The filter system off claim 6, wherein each of the solid plates are connected to an outlet brace of the housing.

8. The filter system of claim 5, wherein each of the plurality of porous elongate bodies further comprises a ferrule connected about the first end.

9. The filter system of claim 8, wherein each of the ferrules are connected to an inlet brace of the housing.

10. The filter system of claim 5, wherein a flow of a fluid through the filter system from the inlet through the outlet comprises a flowrate greater than 500 standard liters per minute and a pressure differential of less than about 10 pounds per square inch.

11. A method of manufacturing a filter comprising:
rolling a first sheet into a first porous elongate body such that there is a portion of the sheet overlapping itself and wherein the portion is about an eighth of an inch in the circumferential direction of the rolled sheet;
seam welding the portion of the first porous elongate body to provide a first seam weld; and
welding along a length of the first porous elongate body along a longitudinal axis of the porous elongate body at a location substantially 180 degrees offset from the first seam weld, to form a second weld.

12. The method of claim 11, further comprising seam welding a connector about a first end of the first porous elongate body.

13. The method of claim 11, further comprising seam welding a solid plate at a second end of the first porous elongate body.

14. The method of claim 11, further comprising disposing a second sheet about the first porous elongate body.

* * * * *